Figure 3:
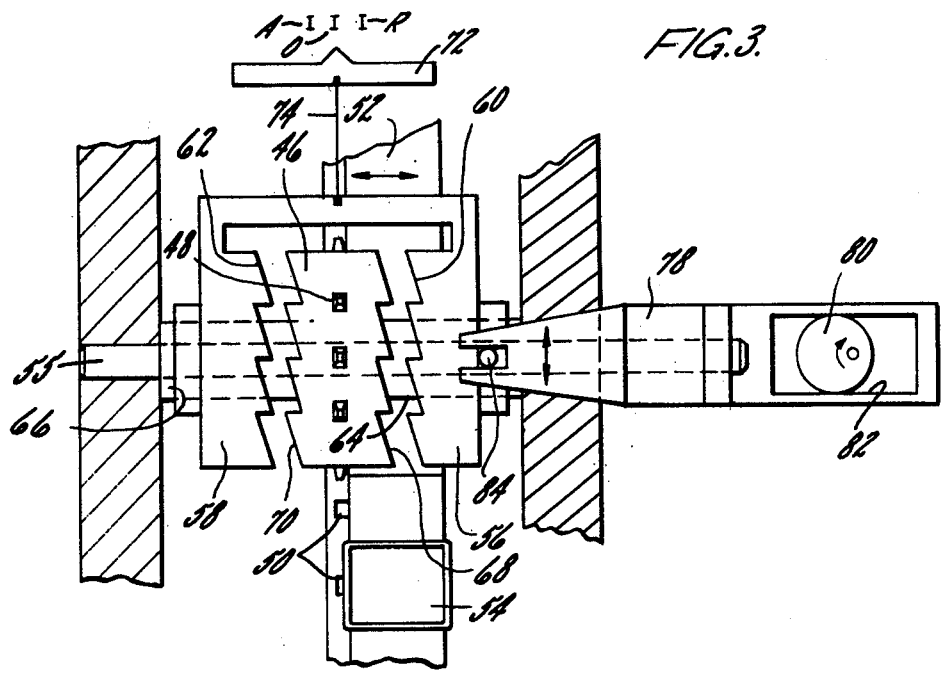

United States Patent [19]

Staar

[11] 4,110,019
[45] Aug. 29, 1978

[54] INTERMITTENT DRIVE MECHANISM FOR FILM

[75] Inventor: Marcel Jules Helene Staar, Brussels, Belgium

[73] Assignee: Staar S.A., Belgium

[21] Appl. No.: 691,605

[22] Filed: Jun. 1, 1976

[30] Foreign Application Priority Data

Jun. 5, 1975 [BE] Belgium .................................. 829918

[51] Int. Cl.² ............................................. G03B 1/24
[52] U.S. Cl. ...................................... 352/188; 226/76
[58] Field of Search ............... 352/188, 187, 189, 190; 226/76

[56] References Cited

U.S. PATENT DOCUMENTS

| 1,714,461 | 5/1929 | Chanier | 226/76 |
| 3,301,628 | 1/1967 | Hellmund | 352/169 |
| 3,591,265 | 7/1971 | Shropshire | 352/169 |

FOREIGN PATENT DOCUMENTS

| 912,901 | 5/1946 | France | 352/187 |
| 488,497 | 7/1938 | United Kingdom | 352/188 |

Primary Examiner—Monroe H. Hayes
Attorney, Agent, or Firm—Leydig, Voit, Osann, Mayer & Holt, Ltd.

[57] ABSTRACT

An intermittent drive mechanism for film is disclosed. A driven wheel having sprocket teeth for engagement in perforations in film is coupled by face teeth with the driving wheel and supported for turning about a common axis provided by a supporting shaft. The driving wheel is oscillated by an arm also supported on the common shaft. The teeth on both the driving and driven wheels have a saw-tooth shape and mesh to turn the ratchet wheel when the driving wheel is turned in one direction by the arm, and cooperate to move the driving wheel axially to an idle position when the driving wheel is turned in the other direction by the arm. Also disclosed is a bi-directional drive in which a driving wheel having face teeth on both lateral faces is provided and which is movable axially to bring one or the other sets of face teeth into operative engagement with axially spaced driven wheels having similar face teeth.

7 Claims, 7 Drawing Figures

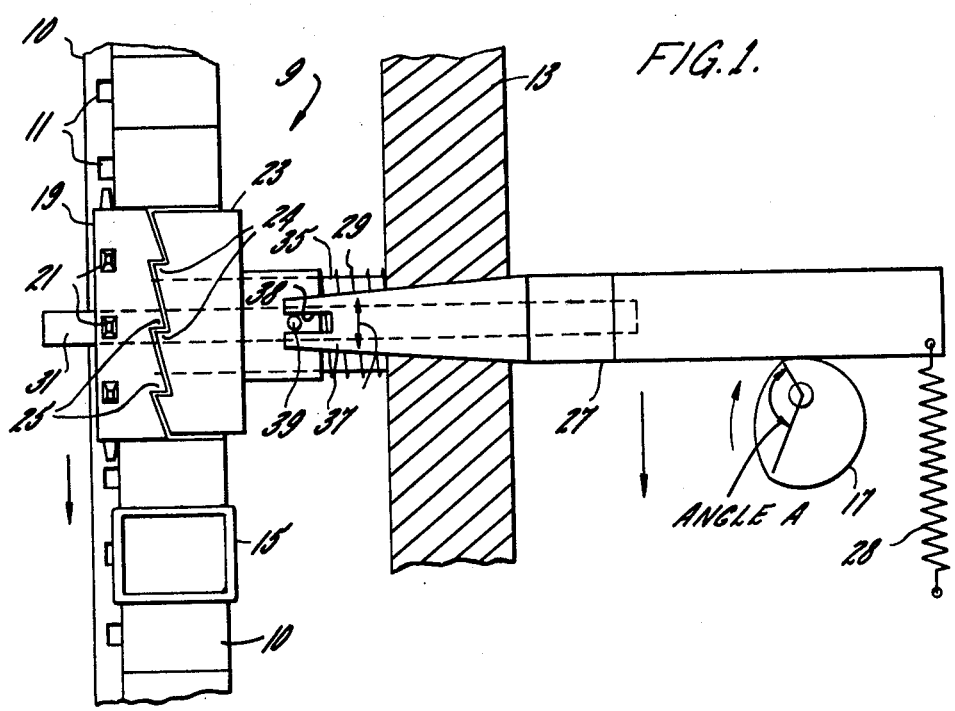
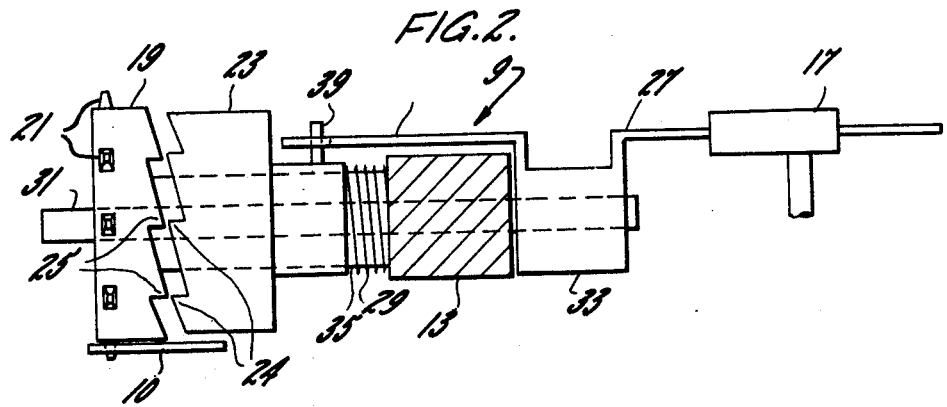

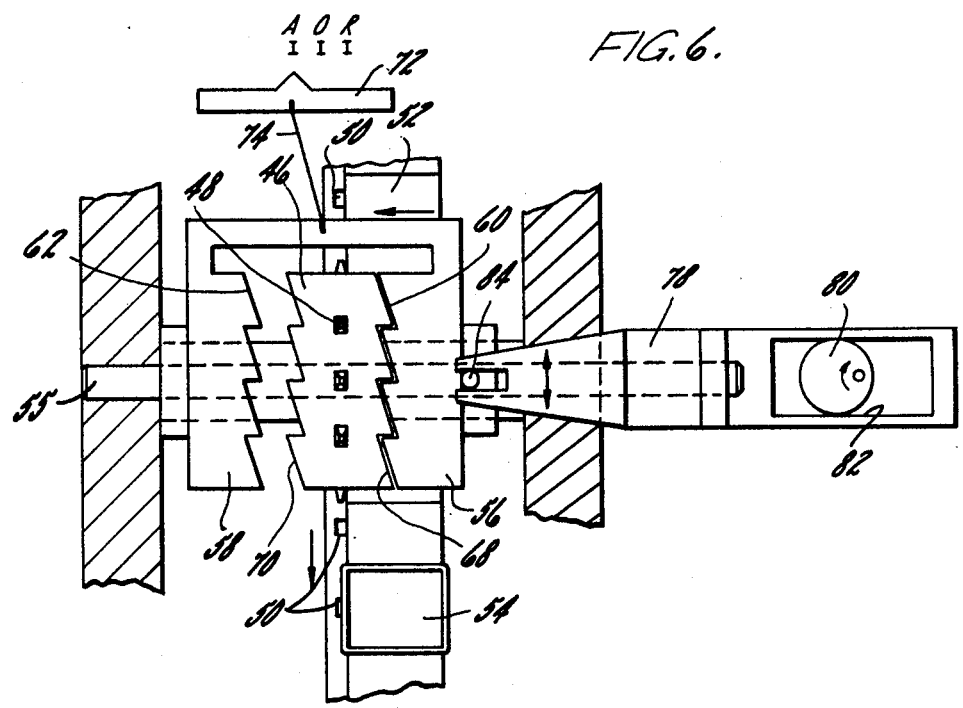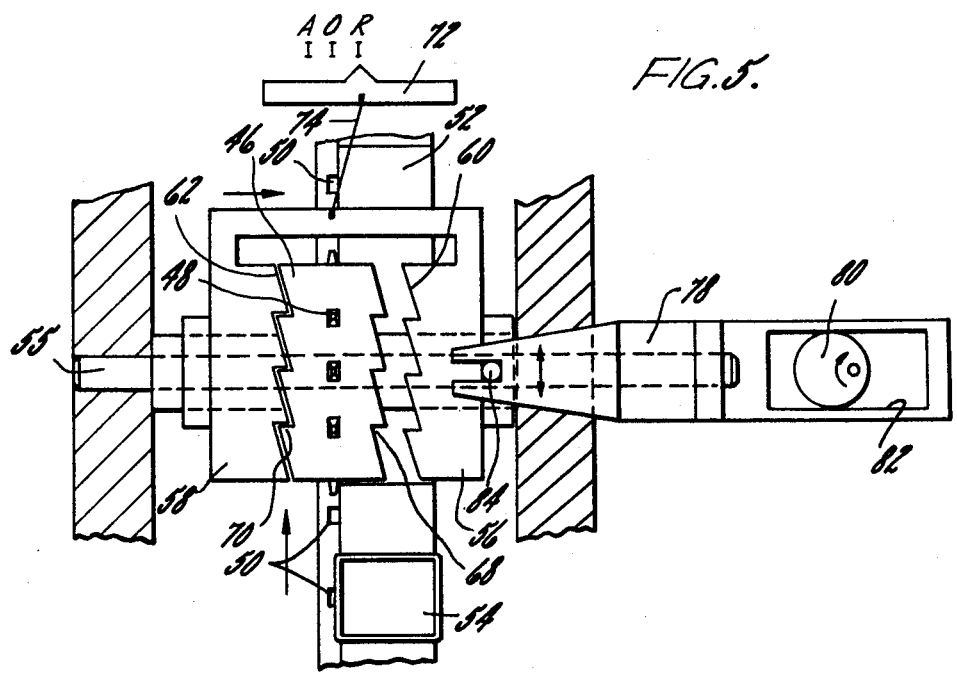

INTERMITTENT DRIVE MECHANISM FOR FILM

This invention relates to intermittent drives of the type used to produce intermittent motion of film in motion picture projectors.

In the movement of film in motion picture projectors, the film is not moved continuously, rather each frame is shifted to the projecting position while the shutter is closed, and the film remains stationary for a fractional part of a second while the shutter is open and the picture is projected on the screen. When the shutter is again closed, the next successive frame is shifted to the projecting position.

It is important to give the film a very rapid intermittent motion because it is necessary to have the shutter closed when this movement occurs, and the length of time that the shutter is closed should be reduced to a minimum to reduce flicker. It is also important to minimize stress on the film, by starting the film movement slowly without shock, and after the film has reached full speed, to gradually reduce its velocity. It is important also to have no lost motion of the driven wheel or sprocket engaging the film, and to achieve the intermittent motion with a quiet mechanism.

Heretofore, many different types of mechanisms have been proposed for intermittent motion drives for film projectors. The most common drives use different types of "geneva wheel" gearing for this purpose. While these types of mechanisms do provide the requisite intermittent movements, they are complex and costly to produce. Moreover, because the clearance between the moving components of geneva wheel gearing are typically so close, once the parts being to wear they malfunction and jam or become noisy or erratic in operation.

The present invention has as its principal object to provide an intermittent drive for use in motion picture film projectors, which provides very rapid intermittent motion without shock and without imposing injurious stress on the film, and which is less complex than many such drives proposed heretofore, being made essentially of molded plastic parts.

It is a related object to provide an intermittent drive for film, suited particularly for low cost motion picture projectors of the type, for example, used for projection of Super 8 movie film in the home, where the requisites of the intermittent drive are long-life, trouble-free operation, and low cost.

Another object is to provide a bi-directional intermittent drive for motion picture film projectors, to enable the operator to reverse the film movement and position the film to project a given frame or view on the screen, or to review a section of the film.

Figure 7:
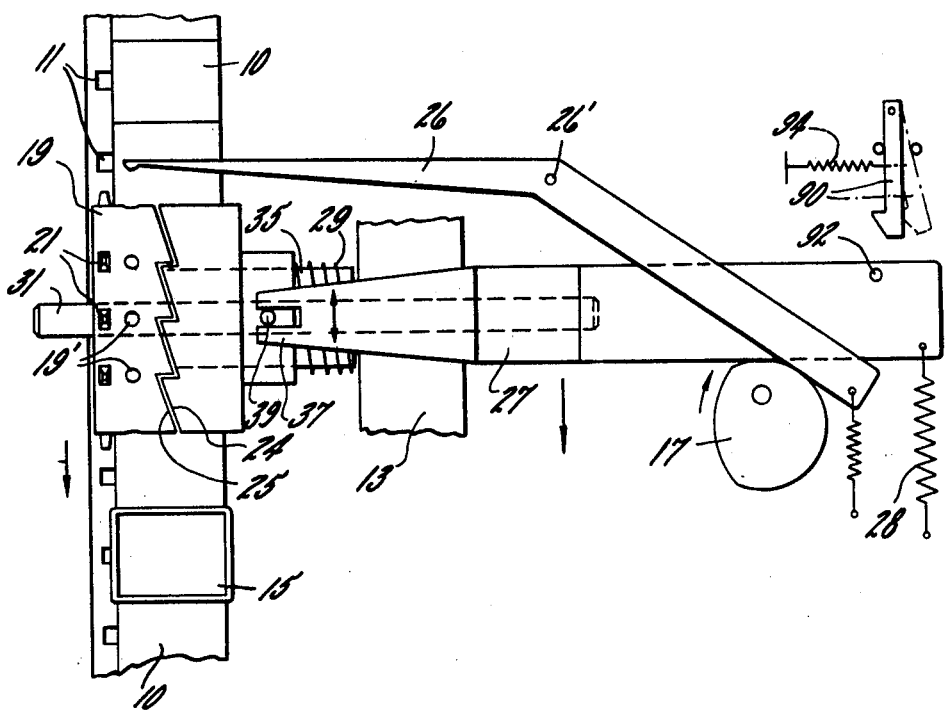

These and other objects of the invention will become apparent from the following description taken in connection with the accompanying drawings, wherein:

FIG. 1 is plan view of an intermittent drive mechanism embodying this invention, and FIG. 2 is a side elevation with parts in section of the drive illustrated in FIG. 1, FIGS. 3-6 are plan views of an alternative embodiment of this invention, a bi-directional intermittent drive mechanism; and FIG. 7 is a plan view of the mechanism of FIG. 1 including means for locking the ratchet wheel, both during the idle period and to stop the film.

The invention is shown in FIGS. 1 and 2 embodied in an intermittent drive mechanism 9 for film 10 of the type having a single row of perforations 11, such as "Super 8" film. Those components of the projector for guiding and supporting the film in its movement through the projector are not illustrated, it being understood that they are not part of the invention. Illustrated is a portion of the machine chassis 13 which carries the drive mechanism 9 and a framed aperture 15, through which each successive film frame is projected on a screen, and having a shutter mechanism (not shown) associated with it. It will be understood that in the operation of the motion picture projector, a very rapid intermittent motion is required in moving the film 10 to draw each view or frame down to the projecting position behind the framed aperture 15 while the shutter is closed, and to hold the film stationary for a fractional part of a second while the picture is projected on the screen; then, while the shutter is again closed, the next successive frame is moved to the projecting position.

There is an important relation between the shutter mechanism and the intermittent motion gearing of the projector. This is due to the fact that the shutter must be closed while the film is being moved. The film movement must be very rapid so that the shutter blades may be proportionately reduced in area, thus leaving more open space for the light.

In carrying out the present invention, the rapid intermittent movement is provided by a cam 17 revolved by the motion picture projector motor through appropriate gearing. During a portion, about one third, of one revolution of the cam, the driven ratchet wheel 19 of a ratchet mechanism is advanced the full distance between successive frames on the film 10 to shift a new frame to projecting position rapidly, and during the remaining portion of the cam revolution the driven ratchet wheel 19 is idle and the film is stopped while the ratchet mechanism is cocked for the next film movement. The driven ratchet wheel 19 has sprocket teeth 21 on its periphery engaged in the perforations 11 and connecting the ratchet wheel to move the film when the ratchet wheel is turned, the distance between perforations 11 (e.g. the "pitch") corresponding to the distance between successive film frames.

To turn the driven ratchet wheel 19, a driving toothed wheel 23 is provided with the driven ratchet wheel 19 having ratchet teeth 24 on one face which contact teeth 25 on one one face of the driving wheel 23. The teeth 24, 25 on both wheels 19, 23 are of asymmetrical complementary saw-toothed shape, and when the driving wheel 23 is turned in a clock-wise direction, as viewed from the right in FIGS. 1 and 2, the teeth 24, 25 are fully in mesh and the driving wheel turns the ratchet wheel. When the driving wheel 23 is turned in the other (counter clock-wise) direction, the slope of the back of the ratchet wheel teeth 24 causes the driving wheel 23 to simply lift and slide over the points of the teeth 25 on the ratchet wheel 19 and the ratchet wheel idles.

In the form of the invention shown in FIGS. 1 and 2, no pawl or other like mechanism is indicated to prevent backward rotation of the ratchet wheel; that is, the ratchet wheel 19 and sprocket formed integrally therewith are not locked against backward movement during the idle period.

Turning to FIG. 7 means are there shown for locking the ratchet wheel 19. For this purpose, a pawl 26 is mounted on the chassis, and adapted to enter each one of a series of detents 19' on the surface of the ratchet wheel and thus lock the wheel against movement. The pawl 26 is pivotally mounted on a pin 26' and operated by the cam 17 so that the pawl 26 is actuated to engage and enter one of the detents 19', and lock the ratchet wheel 19 during the idle period when the cam 17 also operates the arm 27 to turn the driving wheel counter clock-wise to cock the ratchet mechanism for the next film frame advance. Thus the ratchet wheel 19 and the film are locked during the interval when a film frame is projected.

To produce the requisite oscillating turning movements of the driving wheel 23, according to the present invention an arm 27 is provided which is connected to the driving wheel 23 and which is oscillated by rotary cam means including the rotating cam 17 and the tension spring 28 at the extreme right end of the arm 27 (as viewed in FIG. 1) which holds the arm so that it follows the surface of the cam.

It is important that the driven ratchet wheel 19 moving the film be started gradually from a state of rest and its motion also gradually checked. To this end, that one-third of the working surface of the cam 17 between the angle A is shaped not only to produce the requisite amplitude of the oscillation of the arm 27, but to uniformly accelerate and decelerate its motion and the turning movements of the driving wheel 23. It will be seen that the cam means oscillates the arm 27 at a constant frequency and amplitude and turns the driving wheel 23 first in one direction and then in the other. The amplitude of the oscillations of the arm, and the corresponding turning movements of the driving wheel 23 are also equal to the pitch of the teeth 24, 25 on both wheels, such that the film 10 is moved the pitch distance upon each oscillation of the arm 27.

For supporting the components of the ratchet mechanism in cooperating relationship, they are all carried on a fixed shaft 31 which projects, as herein shown, through the chassis 13 so that one end of the shaft carries the arm 27, the arm having an offset mounting section 33 so that the arm is supported for swinging movement on the shaft. The other end of the shaft 31 carries the driven ratchet wheel 19 which has a projecting hub 35 for supporting the driving wheel 23, so that the shaft 31 supports the wheels face to face and to turn about the axis of the shaft.

The bifurcated innermost end 37 of the arm 27 engages a pin 39 projecting from the driving wheel 23 so that the arm 27 and driving wheel 23 are coupled and oscillate together, while the pin 39 is moveable lengthwise in the slot 38 on the end of the arm 27 as the driving wheel lifts over the teeth of the ratchet wheel 19 during the retraction portion of the oscillation of the driving wheel. The driving wheel 23 and driven wheel 19 are resiliently urged toward each other by a light coil spring 29; with a fixed mounting shaft 31, a snap ring or similar stop means is provided to prevent movement of the driven ratchet wheel 19 along the shaft 31 away from the chassis 13, which enables the driving wheel 23 to lift away from the ratchet wheel against the force of the spring 29 and idle the ratchet wheel when the driving wheel is retracted.

It will be seen that with the mounting arrangement illustrated, the oscillating motion of the arm 27 is along an arc, the center of which is the axis of the mounting shaft 31, and thus where the arm engages the working surface of the cam 17 it will ride up and down along the cam surface a slight distance as the cam rotates. For this reason, the surface of the cam 17 is wider, as shown, than the arm 27 so as to remain in contact with the arm despite its slight up and down travel. The oscillation of the arm 27 is transmitted to the driving wheel 23 which is freely rotatably mounted on the hub 35 extending from the driven wheel 19, and is movable axially as permitted by the slot 38 which receives the pin 39.

Now, turning to FIGS. 3–6, an alternative form of the invention is there shown providing a bi-directional intermittent drive for film. With this drive, the film may be advanced for normal motion picture projection, and may be reversed so that the operator may position and stop the film to project a given frame or view on the screen, and continue the reversal or resume the normal film advance.

Figure 4:
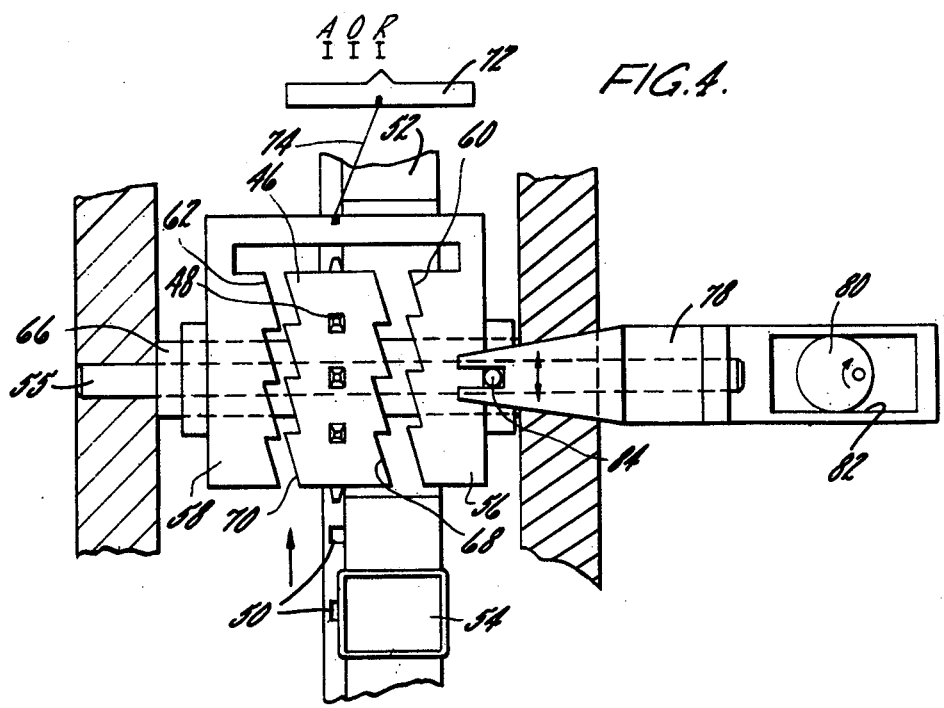

As shown in FIG. 3, a ratchet mechanism embodying this form of the invention utilizes a ratchet wheel 46 having projections 48 on its periphery engaged in perforations 50 in the film 52. The film as in the case of the embodiment of the invention shown in FIGS. 1 and 2, is of the type having perforations evenly spaced along one edge of the film. The film for normal projection is moved to successively advance each view or frame into projecting position adjacent the framed aperture 54 by intermittent turning movement of the ratchet wheel 46. The ratchet wheel is fixed against end-wise movement and supported for turning about the axis of a mounting shaft 55. For turning the ratchet wheel 46, a pair of interconnected spaced driving wheels 56, 58 are provided each having a set of driving teeth 60, 62 on one face. Fastened to the ratchet wheel 46 are hubs 64, 66 projecting in both directions from the ratchet wheel and journaled on the shaft 55. The interconnected driving wheels 56, 58 are supported for turning movement and for axial movement on the hubs 64, 66. It will be seen that the spacing between the driving wheels 56, 58 is such as to provide an intermediate non-coupled position between the ratchet wheel 46 and the driving wheels 56, 58 in which position the wheels of the ratchet mechanism are shown in FIG. 3. The ratchet wheel 46 has a set of ratchet teeth 68, 70 on each of its opposite faces, and means are provided, selectively operable, for shifting the driving wheels 56, 58 axially relative to the ratchet wheel 46 to bring one of the facing sets of teeth, 60, 68 or 62, 70 into cooperating relation while the other of said facing sets is fully separated. Said selectively operable means is shown herein as a manually moveable bar 72 having a pointer designating the position of the bar — A for Advance — O for Intermediate or Uncoupled — R for Reverse. The bar 72 is connected by a member 74 which as herein shown also serves as a resilient means for urging the interconnected driving members 56, 58 in one axial direction or the other. For example, as shown in FIGS. 4 and 5, the interconnected driving members have been shifted so that the ratchet mechanism is actuated to move the film in the reverse direction. In FIG. 6, the bar 72 has been shifted to actuate the ratchet mechanism to move the film in the advance direction for normal motion picture projection.

As in the form of the invention shown in FIGS. 1 and 2, the driving wheels 56, 58 are oscillated to turn the ratchet wheel and move the film. For this purpose, an arm 76 having an offset section 78 supporting the arm 76 for swinging movement about the shaft 55, is oscillated by a rotary cam 80. In this case, the cam 80 is received in a substantially rectangular slot 82 in the arm 76 so that the arm 76 is positively oscillated, and is connected by means of the pin 84 to oscillate the interconnected driving wheels 56, 58. The rotary cam means including the cam 80 turns the driving wheels 56, 58 first in one direction and then in the other at a constant frequency and amplitude. The amplitude of the oscillations of the arm 76 and the turning movements of the driving wheels 56, 58 are equal to the pitch of the driving teeth 60, 62 (likewise the pitch of the ratchet wheel teeth 68, 70) so that the driving wheels 56, 58 turn the ratchet wheel 46 and move the film the pitch distance of said teeth upon each oscillation of the arm 76. It is also to be noted that the distance between the perforations 50 in the film (the pitch of the perforations) is equal to the pitch of the teeth on the wheels. Thus, one revolution of the cam 80 moves the film 50 the pitch distance between the perforations in the film.

To achieve the bi-directional aspect of the ratchet mechanism, as shown in FIGS. 3-6, the teeth of each facing set, for example the set of driving teeth 60 and ratchet teeth 68, have asymmetrical complementary saw-toothed shape. The teeth of one facing set (60, 68) have the opposite hand with respect to the teeth of the other facing set (62, 70). Thus the teeth of one facing set mesh to turn the ratchet wheel in one direction and ratchet to lift the driving wheels 56, 58 away from the ratchet wheel 46 (as shown in FIG. 4) and idle the ratchet wheel, on oscillation of the arm, and the teeth of the other facing set mesh to turn the ratchet wheel 46 in the other direction and ratchet to lift the driving wheels 56, 58 away from the ratchet wheel 46, upon the oscillation of the arm 76, depending on the facing set brought into cooperating relation by the selectively operable means including the bar 72. As in the case of the embodiment of the invention shown in FIGS. 1 and 2 the back of the teeth on both the driving wheels and the ratchet are inclined at an angle as to cause the driving wheels to lift away from the ratchet wheel (FIG. 4) when the driving wheel is turned in one direction, the teeth meshing in the other direction of movement of the driving wheels (FIG. 5).

Now turning to FIG. 7, in addition to the pawl 26 for locking the ratchet wheel 19 during idle periods, the mechanism herein shown also includes a latching member 90 engageable with a latch pin 92 on the arm 27 to hold the arm free and clear of the rotating cam and thus latch the intermittent drive mechanism against movement by the cam to stop the film. The latch member 90 is drawn by spring 94 toward the left in FIG. 7 and is illustrated in position to catch and latch the arm 27 upon movement of the arm by the cam.

I claim as my invention:

1. In an intermittent drive mechanism for film,
   a driven ratchet wheel having a ring of ratchet teeth on one face,
   exterior sprocket teeth carried by said ratchet wheel and engageable in perforations in film to move said film when said wheel is turned,
   a driving wheel having a ring of teeth on one face,
   a shaft for supporting said driving wheel and said ratchet wheel face to face and to turn about the axis of said shaft,
   means for resiliently urging said wheel axially toward each other and said teeth into contact,
   said teeth on both said sheels having asymmetrical complementary saw-toothed shape, said teeth meshing to turn said ratchet wheel when said driving wheel is turned in one direction and ratcheting to lift said driving wheel away from said ratchet wheel against the resistance of said resilient means and idle said ratchet wheel when said driving wheel is turned in the other direction,
   an arm supported for swinging movement on said shaft and connected to turn said driving wheel,
   and rotary cam means for oscillating said arm and for turning said driving wheel first in one direction and then in the other at a constant frequency and amplitude, the amplitude of the oscillations of said arm and the turning movements of said driving wheel being equal to the pitch of said teeth and the distance between said film perforations so that said driving wheel turns said ratchet wheel and moves said film the pitch distance upon each oscillation of said arm,
   said ratchet wheel having a series of indentations adjacent said sprocket teeth, and
   a pawl engageable in said indentations for holding said ratchet wheel idle during the ratcheting of said driving wheel and released from said indentations when said driving wheel is turned in said one direction to turn said ratchet wheel and move said film.

2. An intermittent drive mechanism for film according to claim 1 wherein cam means operates said pawl and engages said ratchet wheel to lock said ratchet wheel against movement during its idle period.

3. An intermittent drive mechanism for film according to claim 1, including a latch for holding said pawl against movement by said cam means to lock said wheel against movement and stop the film.

4. In a bi-directional intermittent drive mechanism for film, a driven ratchet wheel having a set of ratchet teeth on each of its opposite faces,
   means connecting said ratchet wheel to move said film when said wheel is turned,
   a pair of interconnected spaced driving wheels each having a set of driving teeth on one face,
   means for supporting said wheels for turning movement about a common axis with said ratchet wheel between said driving wheels so that each set of driving teeth faces one set of ratchet teeth, selectively operable means for shifting said driving wheels axially relative to said ratchet wheel to bring one of said facing sets of teeth into cooperating relation while the other of said facing sets is fully separated,
   said teeth of each facing set having asymmetrical complementary saw-toothed shape, the teeth of one facing set having the opposite hand with respect to the teeth of the other facing set,
   means for oscillating said driving wheels,
   the teeth of one facing set meshing to turn said ratchet wheel in one direction and ratcheting to lift said driving wheels away from said ratchet wheel and idle said ratchet wheel, upon such oscillation, and the teeth of said other facing set meshing to turn said ratchet wheel in the other direction and ratcheting to lift said driving wheels away from said ratchet wheel and idle said ratchet wheel, upon such oscillation, depending on the facing set brought into cooperating relation by said selectively operable means.

5. An intermittent drive mechanism for film according to claim 4 wherein said means for oscillating said driving wheels includes an arm supported for swinging movement about said common axis and connected to said wheels, and cam means for oscillating said arm.

6. An intermittent drive mechanism for film according to claim 4 wherein said pair of driving wheels are spaced axially and interconnected for turning movement in unison by the same means.

7. An intermittent drive mechanism for film according to claim 4 including means engaging said ratchet wheel to lock said ratchet wheel against movement during the ratcheting of a driving wheel.

* * * * *